US011288836B2

(12) United States Patent
Park et al.

(10) Patent No.: US 11,288,836 B2
(45) Date of Patent: Mar. 29, 2022

(54) APPARATUS AND METHOD FOR MANAGING FEATURE POINT MAP

(71) Applicant: Electronics and Telecommunications Research Institute, Daejeon (KR)

(72) Inventors: Sang Heon Park, Daejeon (KR); Young Suk Yoon, Cheongju-si (KR); Hyun Woo Cho, Sejong-si (KR); Sung Uk Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 28 days.

(21) Appl. No.: 16/822,801

(22) Filed: Mar. 18, 2020

(65) Prior Publication Data
US 2020/0302639 A1   Sep. 24, 2020

(30) Foreign Application Priority Data
Mar. 19, 2019 (KR) .................... 10-2019-0031512

(51) Int. Cl.
*G06T 7/73* (2017.01)
*G06T 7/246* (2017.01)

(52) U.S. Cl.
CPC .............. *G06T 7/73* (2017.01); *G06T 7/246* (2017.01); *G06T 2207/30241* (2013.01); *G06T 2207/30244* (2013.01)

(58) Field of Classification Search
CPC .. G06K 9/00791; G06K 9/00805; G06K 9/46; G06K 9/4604; G06K 9/4633; G06T 7/246; G06T 7/70; G06T 7/73; G06T 2207/30241; G06T 2207/30244; G06T 2207/30252; G01C 21/005; G01C 21/38; G01C 21/3804; G05D 1/0212; G05D 1/0231; G05D 1/0238; G05D 1/0246; B60W 60/0011
See application file for complete search history.

(56) References Cited

U.S. PATENT DOCUMENTS

| 8,948,913 B2 | 2/2015 | Choi et al. |
| 2008/0294338 A1 | 11/2008 | Doh et al. |

(Continued)

FOREIGN PATENT DOCUMENTS

| KR | 10-2011-0047797 A | 5/2011 |
| KR | 10-1263233 B1 | 5/2013 |

(Continued)

*Primary Examiner* — Andrew W Johns
(74) *Attorney, Agent, or Firm* — Kile Park Reed & Houtteman PLLC

(57) ABSTRACT

Provided are an apparatus and method for managing a feature point map. The method includes generating an initial travel path through which an environmental information collecting entity moves, determining the generated initial travel path as a travel path for detection and controlling the environmental information collecting entity along the determined travel path for detection, receiving environmental information from the environmental information collecting entity, extracting feature point information from the environmental information, generating a feature point map from the feature point information, and storing the feature point map.

8 Claims, 6 Drawing Sheets

(56) References Cited

U.S. PATENT DOCUMENTS

| | | | |
|---|---|---|---|
| 2010/0070078 A1* | 3/2010 | Kong et al. | G06K 9/00 700/259 |
| 2012/0213443 A1 | 8/2012 | Shin et al. | |
| 2018/0328753 A1* | 11/2018 | Stenning et al. | G01C 21/08 |
| 2020/0047343 A1* | 2/2020 | Bal et al. | A47L 11/4038 |
| 2021/0004015 A1* | 1/2021 | Choi et al. | G01S 17/931 |

FOREIGN PATENT DOCUMENTS

| | | |
|---|---|---|
| KR | 10-2014-0125596 A | 10/2014 |
| KR | 10-1662071 B1 | 10/2016 |
| KR | 10-2017-0074542 A | 6/2017 |

* cited by examiner

APPARATUS AND METHOD FOR MANAGING FEATURE POINT MAP

CROSS-REFERENCE TO RELATED APPLICATION

This application claims priority to and the benefit of Korean Patent Application No. 10-2019-0031512, filed on Mar. 19, 2019, the disclosure of which is incorporated herein by reference in its entirety.

BACKGROUND

1. Field of the Invention

The present invention relates to an apparatus and method for managing a feature point map in augmented reality, and more particularly, to an apparatus and method for detecting occlusion caused by a mobile object using an environmental information collecting entity, which detects characteristics of a surrounding space while moving, and generating and updating a feature point map with high reliability.

2. Discussion of Related Art

In augmented reality, a virtual object or information is superimposed on the environment of the real world so that the virtual object or information may be shown as an object originally present in the environment. To superimpose a virtual object and the like on the real environment, the accurate location and orientation information of a camera of a user device is very important.

For this reason, in augmented reality based on surrounding feature points which is a kind of augmented reality, features of surroundings are collected and transformed into a feature point map, and the location and orientation of a camera of a user device are acquired. For example, the simultaneous localization and mapping (SLAM) algorithm is used to extract and match feature points to spatial information.

Points which are extracted and matched in this way are placed in a three dimensional (3D) coordinate system using triangulation or the like to generate a feature point map (a map used to estimate the orientation of a user device; see FIG. 3) which is represented with feature points in a space.

Feature points extracted from a current image, which are acquired through the camera of the user device on the basis of the generated feature point map, are matched to the feature point map to detect the location and orientation of the camera of the user device.

However, when feature points in an image shown through the camera of the user device are used without consideration of surroundings, feature points are extracted from even a mobile object (a pedestrian, a vehicle, or the like corresponding to a transient object) which has no relationship with a feature point map. Consequently, many errors occur in extracting the location of a camera of a user device, and a user's satisfaction with the use of an augmented reality service is degraded.

SUMMARY OF THE INVENTION

The present invention is directed to providing a reliable feature point map management apparatus and method for generating and updating a feature point map which are capable of coping with a change in surroundings.

According to an aspect of the present invention, there is provided a method of managing a feature point map, the method including generating an initial travel path through which an environmental information collecting entity moves, determining the generated initial travel path as a travel path for detection and controlling the environmental information collecting entity along the determined travel path for detection, receiving environmental information from the environmental information collecting entity, extracting feature point information from the environmental information, generating a feature point map from the feature point information, and storing the feature point map.

The method may further include detecting a mobile object in the received environmental information, determining whether the detected mobile object is an occluding object, when the mobile object is determined as an occluding object, modifying the initial travel path through which the environmental information collecting entity moves to generate a modified travel path, and determining the modified travel path as a travel path for detection.

The generating of the initial travel path may include generating the initial travel path on the basis of a feature point map which is previously generated and stored or generating the initial travel path on the basis of an initial feature point map generated through measurement by the environmental information collecting entity.

The method may further include determining a location of at least one of the environmental information collecting entity and a user device from the extracted feature point information.

The method may further include determining whether to update the initial feature point map on the basis of a variation acquired by comparing the initial feature point map and the generated feature point map and storing the generated feature point map as the initial feature point map when the initial feature point map is determined to be updated.

The variation may correspond to changes in the number and locations of the pieces of feature point information.

According to another aspect of the present invention, there is provided a method of managing a feature point map, the method including generating an initial travel path through which an environmental information collecting entity moves, determining the generated initial travel path as a travel path for detection and transmitting path information based on the travel path for detection to the environmental information collecting entity, receiving environmental information from the environmental information collecting entity, extracting feature point information from the environmental information, generating a feature point map from the feature point information, and storing the feature point map.

The method may further include detecting a mobile object in the received environmental information, determining whether the detected mobile object is an occluding object, when the mobile object is determined as an occluding object, modifying the initial travel path through which the environmental information collecting entity moves to generate a modified travel path, and determining the modified travel path as a travel path for detection.

The generating of the initial travel path may include generating the initial travel path on the basis of a feature point map which is previously generated and stored or generating the initial travel path on the basis of an initial feature point map generated through measurement by the environmental information collecting entity.

The method may further include determining a location of at least one of the environmental information collecting entity and a user device from the extracted feature point information.

The method may further include determining whether to update the initial feature point map on the basis of a variation acquired by comparing the initial feature point map and the generated feature point map and storing the generated feature point map as the initial feature point map when the initial feature point map is determined to be updated.

The variation may correspond to changes in the number and locations of the pieces of feature point information.

According to another aspect of the present invention, there is provided an apparatus for managing a feature point map, the apparatus including a feature point map storage configured to store at least one of an initial feature point map, an updated feature point map, and a detected feature point map, an environmental information collector configured to receive environmental information, a mobile object detector configured to detect a mobile object in the environmental information, a feature point map generator configured to generate the detected feature point map on the basis of the environmental information, a travel path manager configured to generate a travel path of an environmental information collecting entity on the basis of at least one of mobile object information of the mobile object detector, the initial feature point map stored in the feature point map storage, and the detected feature point map, and an environmental information collecting entity controller configured to control the environmental information collecting entity on the basis of the travel path generated by the travel path manager.

The apparatus may further include a feature point map updater configured to determine whether to update the initial feature point map on the basis of a variation acquired by comparing the initial feature point map and the detected feature point map and transfer an updated feature point map to the feature point map storage.

The variation may correspond to changes in the number and locations of the pieces of feature point information.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
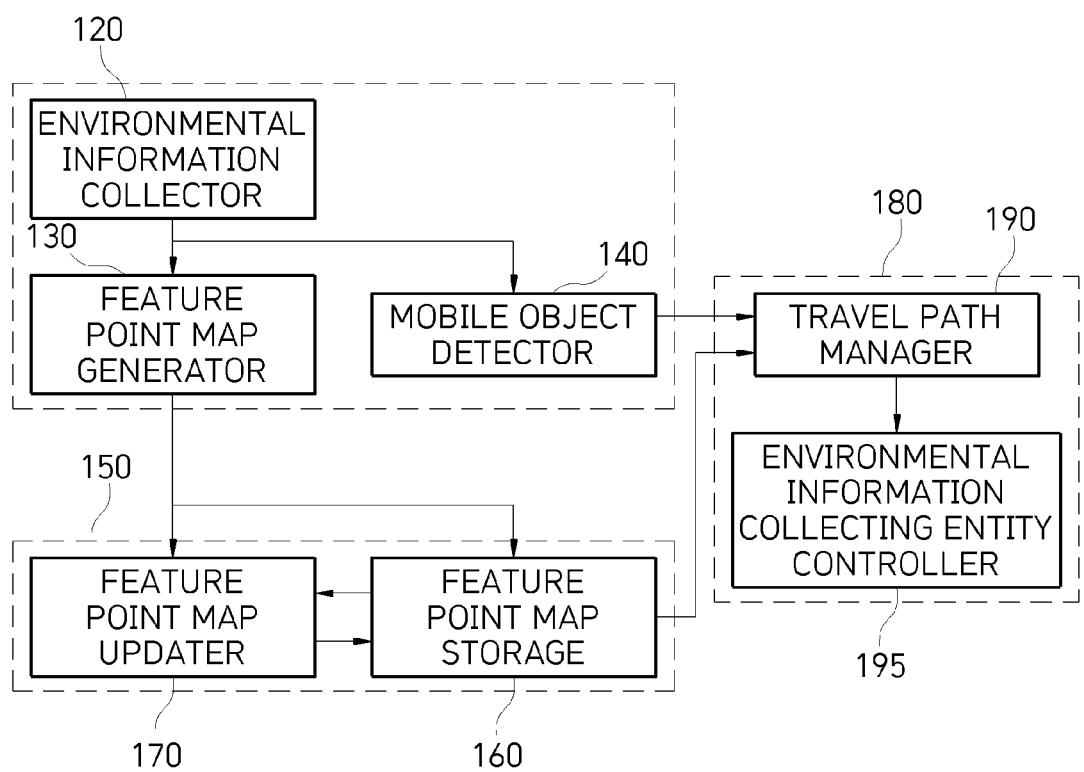
FIG. 1 is a block diagram illustrating an apparatus for managing a feature point map according to an exemplary embodiment of the present invention.

Since the present invention may be variously modified and have various embodiments, some embodiments will be illustrated in the drawings and described in detail. However, this is not intended to limit the present invention to specific embodiments, and it should be understood that the scope of the present invention covers all the modifications, alterations, equivalents, and replacements within the technical spirit of the present invention.

Although the terms, such as first and second, are used to describe various elements, the elements should not be limited by the terms. The terms are used only to distinguish one element from other elements. For example, without departing from the scope of the present invention, a first element may be termed a second element, and similarly, a second element may be termed a first element. The term "and/or" includes any one or all combinations of a plurality of associated listed items.

It is to be understood that when an element is referred to as being "connected" or "coupled" to another element, the element may be directly connected or coupled to the other element or an intermediate element may be present. It is to be understood that there is no intermediate element only when an element is referred to as being "directly connected" or "directly coupled" to another element.

Terminology used in this specification is for the purpose of describing embodiments set forth herein and is not intended to limit the present invention. Unless the context clearly indicates otherwise, the singular forms include the plural forms as well. It is to be understood that the terms "include," "have," etc., when used herein, specify the presence of stated features, integers, steps, operations, elements, parts, and combinations thereof and do not preclude the presence or addition of one or more other features, integers, steps, operations, elements, parts, and combinations thereof.

All terms including technical and scientific terms used herein have the same meaning as commonly understood by those of ordinary skill in the art to which the present invention pertains and should not be interpreted in an idealized or overly formal sense. When any term is defined in this specification, the term should be interpreted accordingly.

Hereinafter, exemplary embodiments of the present invention will be described in detail with reference to the accompanying drawings. In describing the present invention, to aid in overall understanding of the present invention, the same elements may have the same reference numeral, and description of the same elements will not be reiterated.

FIG. 1 is a block diagram illustrating an apparatus for managing a feature point map according to an exemplary embodiment of the present invention.

Referring to FIG. 1, a feature point map management apparatus 100 according to the exemplary embodiment of the present invention includes an environmental information generation module 110 which includes an environmental information collector 120, a feature point map generator 130, and a mobile object detector 140, an environmental information management module 150 which includes a feature point map storage 160 and a feature point map updater 170, and a control module 180 which includes a travel path manager 190 and an environmental information collecting entity controller 195.

The environmental information collector 120 in the environmental information generation module 110 of the feature point map management apparatus 100 according to the exemplary embodiment of the present invention collects (acquires) environmental information, such as an image of surroundings, shown in an environmental information collecting entity or a camera of a user device (a camera installed in a device such as a cellular phone or a tablet personal computer (PC) used by a user) through the corresponding device. Environmental information to be collected is a semi-permanent object, such as a building, and a stationary object which is expected to be fixed for a considerable period of time such as a table in a service space. The environmental information collector 120 of the feature point map management apparatus 100 according to the exemplary embodiment of the present invention may be included in the user device and/or another feature point map management apparatus.

Figure 3:
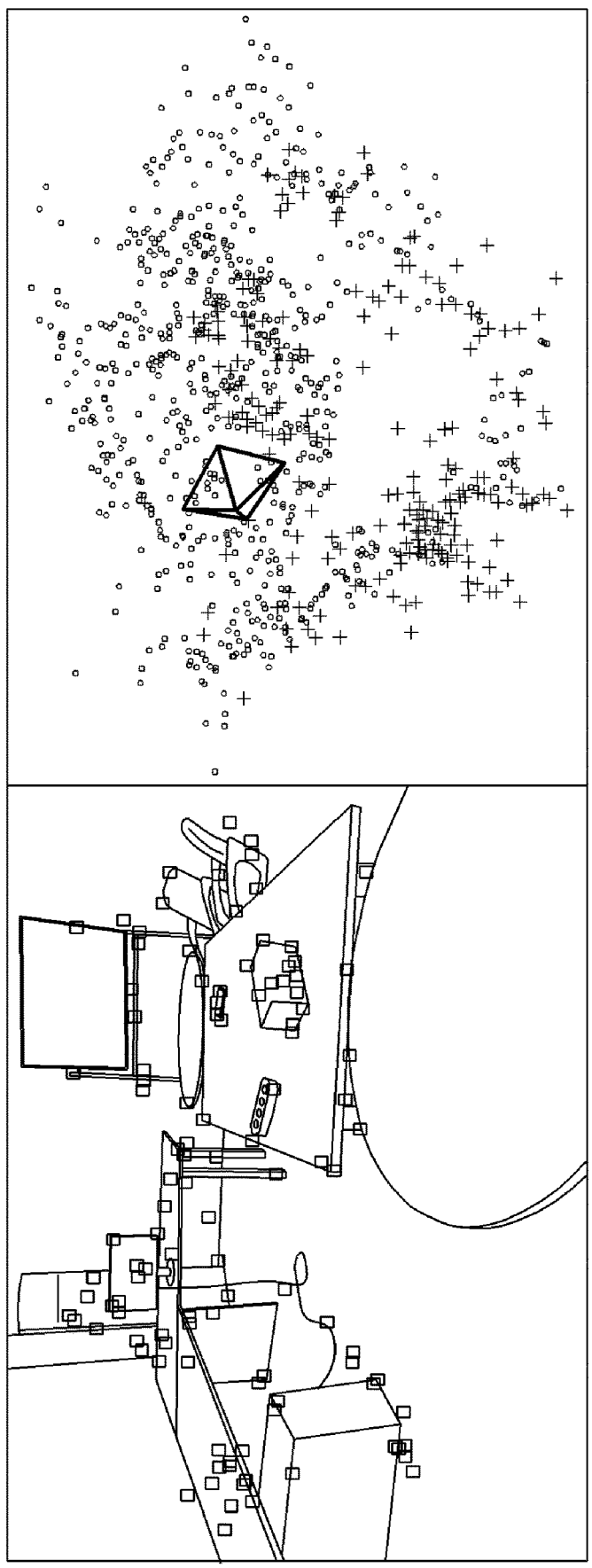
FIG. 3 is a conceptual diagram illustrating a feature point map generated by the method of generating a feature point map according to an exemplary embodiment of the present invention.

The feature point map generator 130 in the environmental information generation module 110 of the feature point map management apparatus 100 according to the exemplary embodiment of the present invention estimates the location of the user device from the environmental information collected by the environmental information collecting entity (or the camera of the user device) and generates a feature point map as shown in FIG. 3.

An example of a method of estimating a location and generating a feature point map is a simultaneous localization and mapping (SLAM) algorithm for extracting feature points from consecutive images using a feature point extraction algorithm and then matching the feature points to a map, but any algorithm for estimating a location and generating a feature point map other than the SLAM algorithm may be used. The feature point map generator 130 according to the exemplary embodiment of the present invention may be included in the user device or the other feature point map management apparatus.

The mobile object detector 140 in the environmental information generation module 110 of the feature point map management apparatus 100 according to the exemplary embodiment of the present invention detects a mobile object in images collected by the environmental information collector 120. A mobile object is not a fixed object or background but is an object which is temporarily present such as a pedestrian or a vehicle.

As a mobile object detection method, a deep learning network employing machine learning, a semantic segmentation algorithm, or the like may be used, and the location and direction of a mobile object may be detected using an optical flow or the like. However, a mobile object detection method and a method of detecting the location and direction of a mobile object are not limited thereto. The mobile object detector 140 according to the exemplary embodiment of the present invention may be included in the user device and/or another feature point map management apparatus.

The feature point map storage 160 in the environmental information management module 150 stores a feature point map. A previously generated feature point map or a feature point map received from another device may be stored in the feature point map storage 160. However, when there is no feature point map initially, the environmental information collecting entity (or the user device camera) may be used to generate an initial feature point map. The feature point map storage 160 according to the exemplary embodiment of the present invention may be included in the user device and/or the other feature point map management apparatus.

The environmental information collecting entity according to the exemplary embodiment of the present invention is a device including a camera for acquiring an image and a processor for executing and processing an associated program and may be a drone, a tablet, a wearable device, a smart phone, or the like. When the environmental information collecting entity does not have a processor, the environmental information collecting entity may execute and process the associated program through data communication with a server including a processor. Also, the feature point map storage 160 according to the exemplary embodiment of the present invention may transmit the stored feature point map to the travel path manager 190 in the control module 180.

Figure 6A:
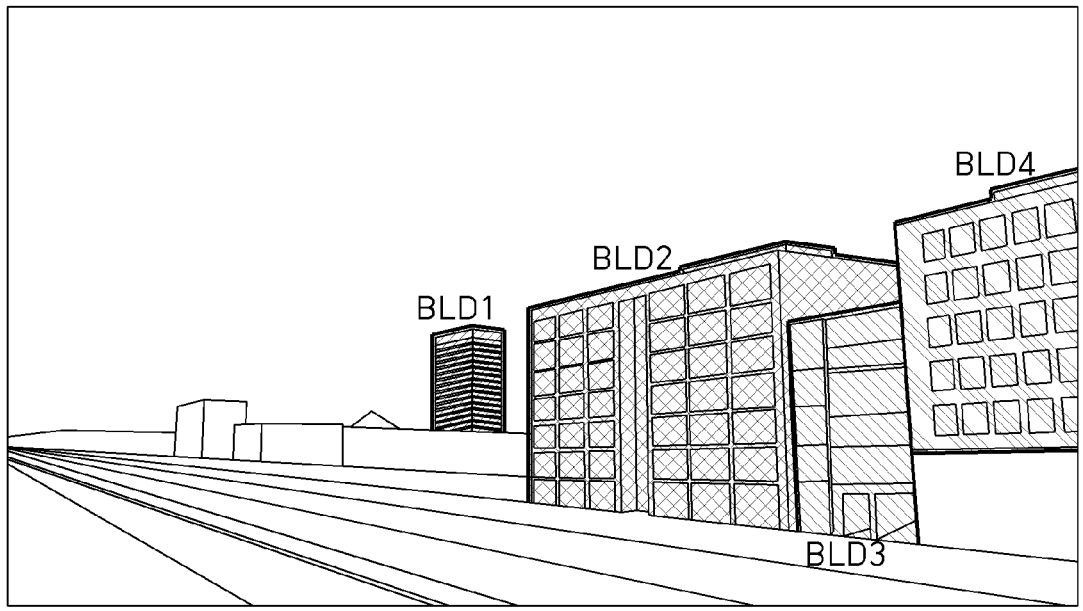
FIGS. 6A and 6B are conceptual diagrams illustrating changes in surroundings in the method of updating a feature point map according to an exemplary embodiment of the present invention.
Figure 6B:
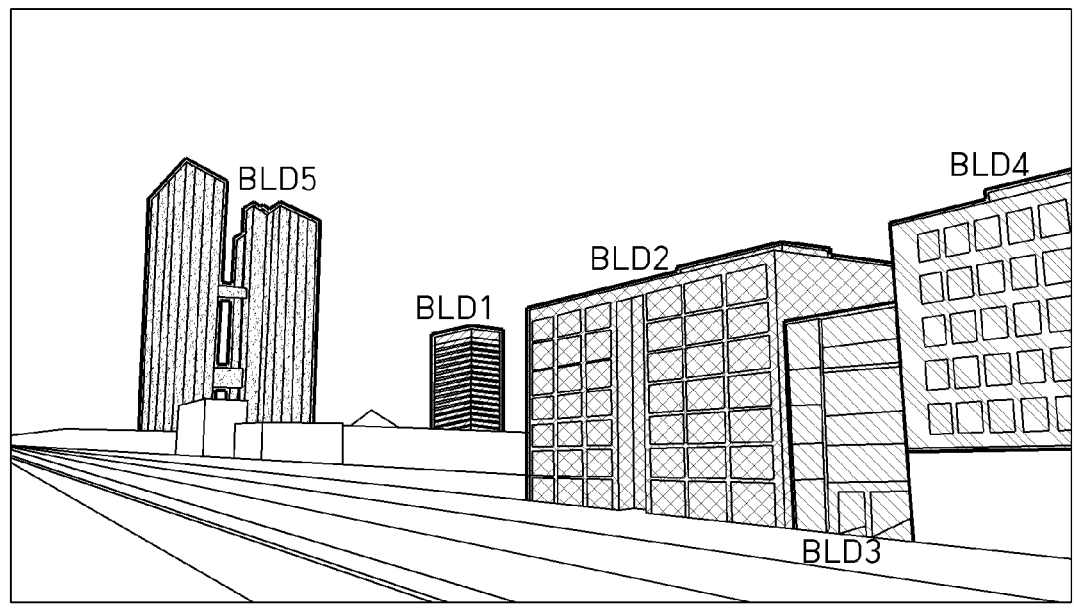

The feature point map updater 170 in the environmental information management module 150 of the feature point map management apparatus 100 according to the exemplary embodiment of the present invention updates the feature point map. As shown in FIGS. 6A and 6B, when a stationary object (building or the like) which has not been present in the environment of an initial feature point map (see FIG. 6A) is newly generated (see FIG. 6B), it is necessary to update the initial feature point map to reflect the new stationary object so that the augmented reality service can be smoothly provided.

To this end, the feature point map updater 170 according to the exemplary embodiment of the present invention receives many feature point maps of a corresponding environment (in this stage, the feature point maps may be classified as detected feature point maps as will be described below) from one or more environmental information collecting entities or user devices, recognizes environmental changes, and updates the feature point map.

The feature point map updater 170 according to the exemplary embodiment of the present invention may update the feature point map by comparing the initial feature point map which is currently applied (including a newly generated feature point map when there is not an initial feature point map) with feature point maps (detected feature point maps) collected from the environmental information collecting entity or the user device.

As an example, the number and locations of feature points in the initial feature point map may be compared with the number and locations of feature points in a detected feature point map, and when changes in the number and locations of feature points exceed certain reference values, the detected feature point map may be updated as an initial feature point map and used as a feature point map for determining a travel path of the environmental information collecting entity. The feature point map updater 170 according to the exemplary embodiment of the present invention may be included in the user device and/or the other feature point map management apparatus.

The travel path manager 190 in the control module 180 of the feature point map management apparatus 100 according to the exemplary embodiment of the present invention generates an initial travel path for generating an initial feature point map or a modified travel path for sensing a mobile object or updating a feature point map.

The travel path manager 190 according to the exemplary embodiment of the present invention may generate the modified travel path on the basis of the travel direction and speed of an environmental information collecting entity 410, the distribution and directivity of detected mobile objects, the distribution of extracted feature points, the distribution of occlusion, and the like.

The environmental information collecting entity controller 195 in the control module 180 of the feature point map management apparatus 100 according to the exemplary embodiment of the present invention controls the environmental information collecting entity 410 to move among the travel path generated by the travel path manager 190 (a travel path for detection determined on the basis of the initial travel path or the modified travel path).

Control of the environmental information collecting entity 410 taken by the environmental information collecting entity controller 195 according to the exemplary embodiment of the present invention includes stop and avoidance movement control of the environmental information collecting entity 410. When it is not possible to extract feature points from a feature point map, the environmental information collecting entity 410 may be controlled to return to a spot from which the location of the environmental information collecting entity 410 is extracted on the basis of the initial feature point map.

Figure 4:
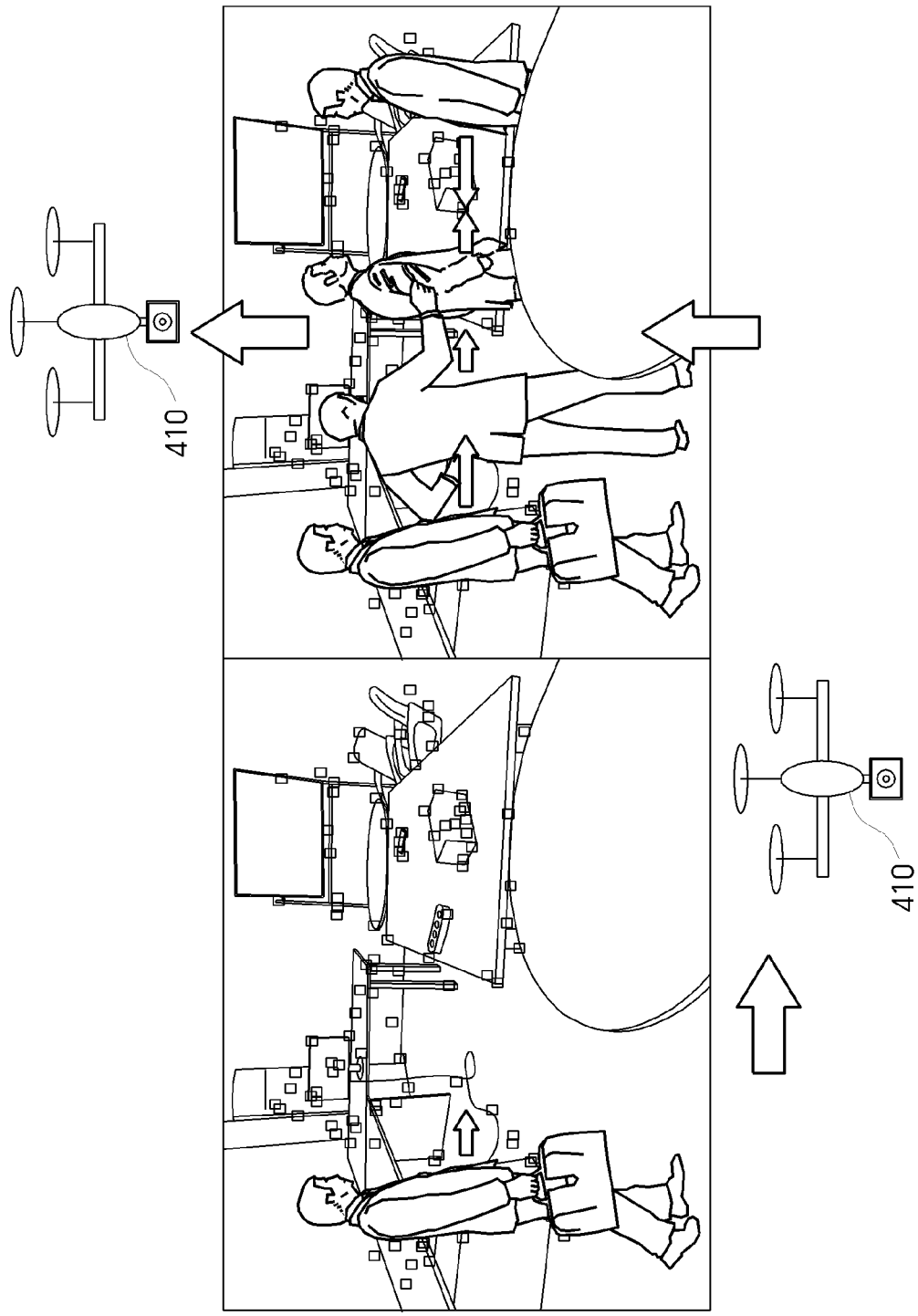
FIG. 4 is a conceptual diagram illustrating control of an environmental information collecting entity in the method of generating a feature point map according to an exemplary embodiment of the present invention.

For example, as shown in FIG. 4, the travel path manager 190 of the control module 180 generates a modified travel path so that the environmental information collecting entity 410 which is collecting environmental information for a feature point map may move to the right or upward in consideration of the travel directions of pedestrians. The modified travel path is determined as a travel path for detection, and the environmental information collecting entity controller 195 controls the environmental information collecting entity 410 on the basis of the travel path for detection.

The travel path manager 190 and/or the environmental information collecting entity controller 195 according to the exemplary embodiment of the present invention may be included in the user device and/or the other feature point map management apparatus. Subsequently, a method in which the feature point map management apparatus 100 of FIG. 1 generates a feature point map without an initial feature point map will be described according to an exemplary embodiment of the present invention.

Figure 2:
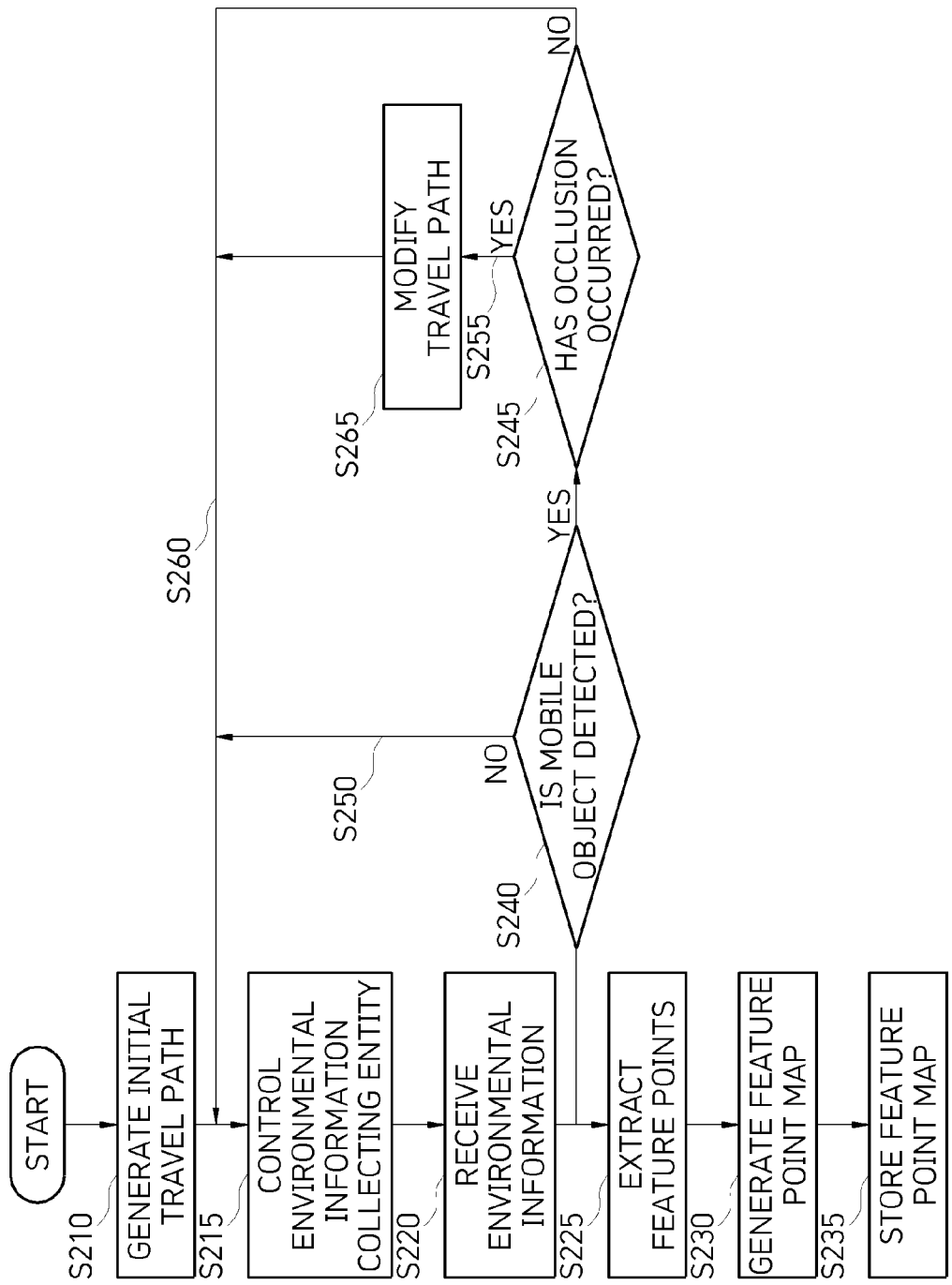
FIG. 2 is a flowchart illustrating a method of generating a feature point map according to an exemplary embodiment of the present invention.

FIG. 2 is a flowchart illustrating a method of generating a feature point map according to an exemplary embodiment of the present invention.

The feature point map generation method according to the exemplary embodiment of the present invention shown in FIG. 2 corresponds to a case in which it is necessary to generate an initial feature point map because no feature point map is stored in the feature point map generator 130.

First, an initial travel path for the environmental information collecting entity to build a feature point map is generated (S210).

For example, environmental information may be collected from the environmental information collecting entity through the environmental information collector 120, and the travel path manager 190 may generate an initial travel path using the environmental information (S210).

Then, the generated initial travel path is determined as a travel path for detection, and the environmental information collecting entity is controlled to move along the travel path for detection (S215). For example, the environmental information collecting entity controller 195 may perform such control.

Subsequently, environmental information is collected from the environmental information collecting entity moving along the travel path for detection (S220). For example, the environmental information collecting entity may provide collected environmental information to the environmental information collector 120, and the environmental information collector 120 may receive the environmental information.

Subsequently, feature points may be extracted from the collected environmental information (S225). The location of the environmental information collecting entity or the user device may be extracted on the basis of the extracted feature points and the initial feature point map. From the feature points extracted through these operations, a feature point map may be generated (S230) and stored (S235). For example, the feature point map generator 130 may extract feature points to generate a feature point map and may store the feature point map in the feature point map storage 160.

Meanwhile, when environmental information is collected along the travel path for detection based on the initial travel path, a mobile object, such as a pedestrian or a moving vehicle, may be detected in the environmental information collection path of the environmental information collecting entity. Therefore, in the feature point map generation method according to the exemplary embodiment of the present invention, it is determined whether a mobile object is detected from the collected environmental information (S240).

When a mobile object is detected in the collected environmental information, it is determined whether occlusion has occurred due to the mobile object (S245). When it is determined that occlusion has occurred due to the mobile object (S255), the initial travel path may be modified (S265). The modified travel path generated through these operations may be determined (updated) as a travel path for detection.

For example, the mobile object detector 140 may detect a mobile object and determine whether occlusion has occurred, and the travel path manager 190 may generate and determine a modified travel path as a travel path for detection. When a mobile object is not detected in the mobile object detection operation (S250) or a mobile object is detected but it is determined that occlusion has not occurred (S260), environmental information is continuously collected on the basis of the initial travel path.

Meanwhile, when a feature point map generated on the basis of environmental information collected from the user device or the environmental information collecting entity is used, a stationary object which has not been in the feature point map may be newly detected. In other words, a stationary object (e.g., a new building or the like) which is not present in the initial feature point map may be detected in a feature point map generated on the basis of environmental information of a specific space collected by the environmental information collecting entity.

In this case, it is necessary to update the feature point map in order to provide a smooth augmented reality service. Subsequently, a feature point map update method in which such a case is taken into consideration will be described according to an exemplary embodiment of the present invention.

Figure 5:
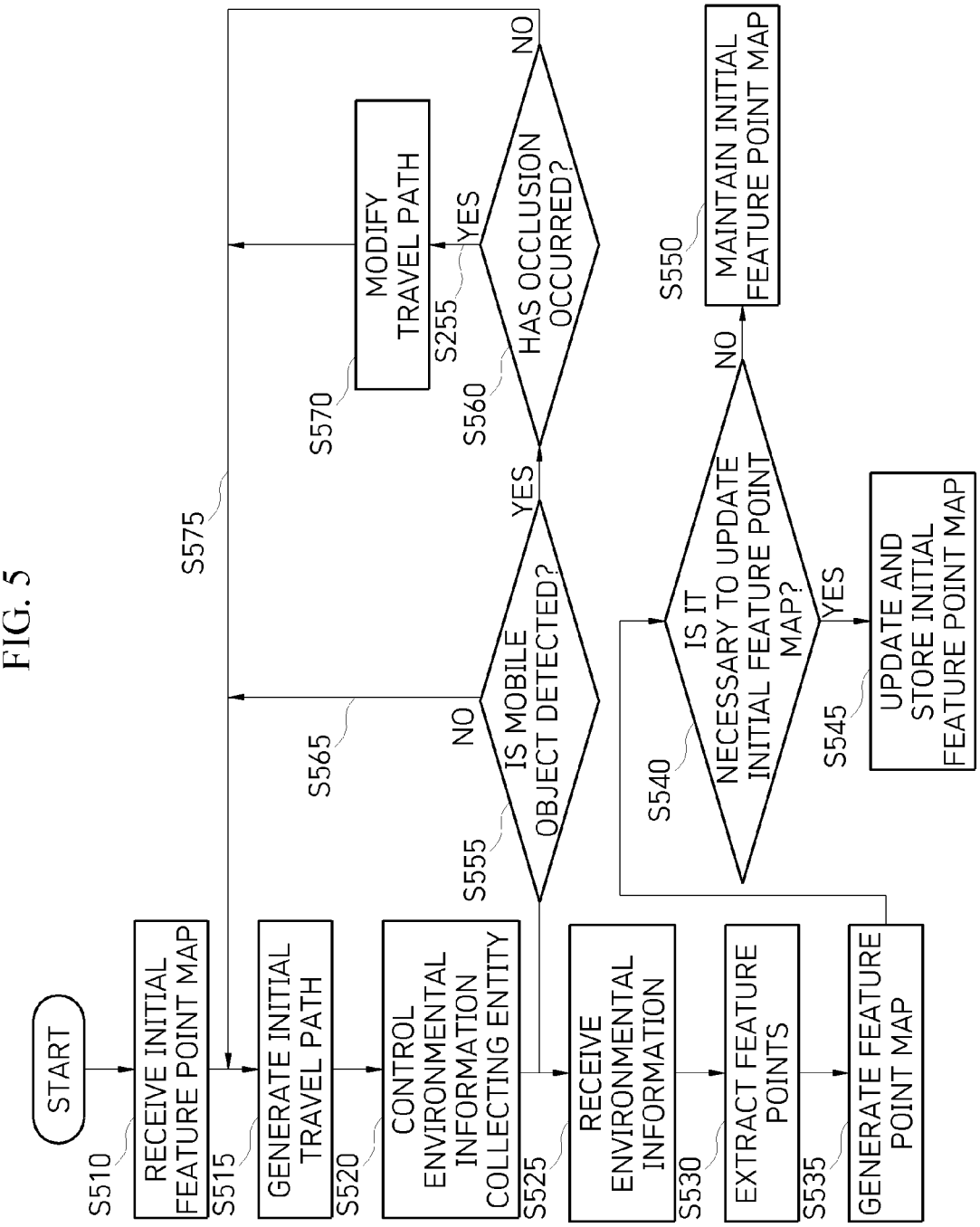
FIG. 5 is a flowchart illustrating a method of updating a feature point map according to an exemplary embodiment of the present invention.

FIG. 5 is a flowchart illustrating a method of updating a feature point map according to an exemplary embodiment of the present invention.

In an augmented reality service based on a feature point map, environmental information applied to generation of an initial feature point map may be based on surroundings shown in FIG. 6A but may be changed to surroundings shown in FIG. 6B over time.

In this case, when the augmented reality service is provided using the feature point map based on the existing environmental information, the location and orientation of a user device are not smoothly detected due to a stationary object which has not been present in the initial feature point map so that satisfaction with the augmented reality service may be degraded. Consequently, it is necessary to update the initial feature point map with the newly changed environmental information and provide the augmented reality service.

In the feature point map update method according to the exemplary embodiment of the present invention, first, an initial feature point map is received (S510). For example, the initial feature point map may be received from a feature point map providing server (not shown) and stored in the feature point map storage 160 or may be initially stored in the feature point map storage 160.

An initial travel path of the environmental information collecting entity is generated using the received initial feature point map (S515). For example, the travel path manager 190 may generate the initial travel path on the basis of the initial feature point map stored in the feature point map storage 160.

Then, the generated initial travel path is determined as a travel path for detection, and the environmental information collecting entity is controlled to move according to the travel path for detection (S520). For example, the environmental information collecting entity controller 195 may perform such control.

Environmental information which is collected by the environmental information collecting entity moving along the travel path for detection is received (S525). For example, the environmental information collecting entity may provide the collected environmental information to the environmental information collector 120, and the environmental information collector 120 may receive the environmental information.

Subsequently, it is determined whether a mobile object is detected (S555), and when a mobile object is detected, it is determined whether occlusion has occurred due to the mobile object (S560). When it is determined that occlusion has occurred, a modified travel path is generated by modifying the initial travel path (S570). When a mobile object is not detected (S565) or it is determined that occlusion has not occurred (S575), the environmental information collecting entity is controlled to receive environmental information according to a travel path for detection based on the initial travel path For example, the mobile object detector 140 may detect a mobile object and determine whether occlusion has occurred, and the travel path manager 190 may generate and determine (update) a modified travel path as a travel path for detection. When a mobile object is not detected in the mobile object detection operation or a mobile object is detected but it is determined that occlusion has not occurred, environmental information is continuously collected on the basis of a travel path for detection based on the initial travel path.

In the feature point map update method according to the exemplary embodiment of the present invention, environmental information collected by the environmental information collecting entity along the travel path for detection based on the initial travel path or the modified travel path may be received to extract feature points (S530). Then, the location of the environmental information collecting entity or the user device may be extracted on the basis of the extracted feature points and the initial feature point map. Also, a feature point map may be generated using the extracted feature points (S535). The feature point map generated in this operation may be referred to as a detected feature point map.

In the feature point map update method according to the exemplary embodiment of the present invention, the initial feature point map is compared with the detected feature point map to determine whether it is necessary to update the initial feature point map (S540).

According to an exemplary embodiment of the present invention, the number and locations of feature points in the initial feature point map are compared with the number and locations of feature points in a detected feature point map, and when a difference in the number and locations of feature points is greater than or equal to a certain reference value (a threshold value), it is determined that it is necessary to update the initial feature point map, and the detected feature point map is updated as an initial feature point map and stored (S545).

On the other hand, when a difference in the number and locations of feature points is smaller than the certain reference value (the threshold value), it is determined that it is unnecessary to update the initial feature point map, and the initial feature point map, which is used, is not updated but is maintained (S550).

For example, the feature point map updater 170 may compare the number and locations of feature points in the detected feature point map received from the feature point map generator 130 with the number and locations of feature points in the initial feature point map stored in the feature point map storage 160. When determining that it is necessary to update the initial feature point map, the feature point map updater 170 may store the detected feature point map in the feature point map storage 160 and update the initial feature point map. Subsequently, a travel path is managed on the basis of the updated feature point map to control the environmental information collecting entity.

Meanwhile, the above-described elements are described as separate devices, but the description is exemplary for convenience of description and to aid in understanding. It is self-evident that the description may be implemented in various forms within the technical scope of the present invention. For example, the feature point map generator 130 and the feature point map updater 170 may be integrated into one module or divided into two or more devices.

Methods according to exemplary embodiments of the present invention can be implemented in the form of program commands, which can be executed by various computing devices, and stored in a computer-readable medium. The computer-readable medium may include program commands, data files, data structures, etc. separately or in combination. The program commands stored in the computer-readable medium may be specially designed or structured for the present invention or well-known and available to those of ordinary skill in the field of computer software.

Examples of the computer-readable medium include hardware devices, such as a read only memory (ROM), a random access memory (RAM), and a flash memory, specially designed to store and execute program commands. Examples of the program commands include not only a machine language code generated by a compiler but also a high level language code executable by a computer using an interpreter. The above-described hardware devices may be configured to operate as at least one software module to perform operation of the present invention, and vice versa.

The embodiments according to the present invention recorded in a computer recoding medium may be applied to a computer system. The computer system may include at least one processor, a memory, a user input device, a user output device, and a storage unit. The above described components perform communication through a bus. In addition, the computer system may further include a network interface coupled to a network. The processor may be a central processing unit (CPU) or a semiconductor device for processing instructions stored in the memory and/or storage unit. The memory and the storage unit may include various forms of volatile or nonvolatile media. For example, the memory may include a read only memory (ROM) or a random-access memory (RAM). Accordingly, the embodiments of the present invention may be embodied as a method implemented by a computer or a non-transitory computer readable media including program executable instructions stored in the computer. When executed by a processor, computer readable commands may perform a method according to at least one aspect of the present invention.

According to the present invention, it is possible to generate and update a feature point map which is not affected by a change in surroundings, such as the appearance of a mobile object. Consequently, the reliability of the feature point map can be improved, and accordingly, it is possible to extract the accurate location and orientation of a camera of a user device in an augmented reality service.

The present invention has been described in detail above with reference to the exemplary embodiments. However, the above-described embodiments are merely examples, and the scope of the present invention is not limited thereto. Those of ordinary skill in the technical field to which the present invention pertains should be able to make various modifications and alterations from the above description within the technical spirit of the present invention. Therefore, the scope of the present invention should be defined by the following claims.

What is claimed is:

1. A method of managing a feature point map, the method comprising:
    generating an initial travel path through which an environmental information collecting entity moves;
    determining the generated initial travel path as a travel path for detection and controlling the environmental information collecting entity along the determined travel path for detection;
    receiving environmental information from the environmental information collecting entity;
    extracting feature point information from the environmental information;
    generating a feature point map from the feature point information;
    storing the feature point map;
    detecting a mobile object in the received environmental information;
    determining whether the detected mobile object is an occluding object;
    when the mobile object is determined as an occluding object, modifying the initial travel path, on the basis of a travel direction and speed of the environmental information collecting entity, a distribution and directivity of the occluding object, a distribution of extracted feature points, and a distribution of occlusion, through which the environmental information collecting entity moves to generate a modified travel path; and
    determining the modified travel path as a travel path for detection.

2. The method of claim 1, wherein the generating of the initial travel path comprises generating the initial travel path on the basis of a feature point map which is previously generated and stored or generating the initial travel path on the basis of an initial feature point map generated through measurement by the environmental information collecting entity.

3. The method of claim 2, further comprising:
    determining whether to update the initial feature point map on the basis of a variation acquired by comparing the initial feature point map and the generated feature point map; and
    storing the generated feature point map as the initial feature point map when the initial feature point map is determined to be updated.

4. The method of claim 3, wherein the variation corresponds to changes in number and locations of the pieces of feature point information.

5. The method of claim 1, further comprising determining a location of at least one of the environmental information collecting entity and a user device from the extracted feature point information.

6. An apparatus for managing a feature point map, the apparatus comprising:
    a feature point map storage configured to store at least one of an initial feature point map, an updated feature point map, and a detected feature point map;
    an environmental information collector configured to receive environmental information;
    a mobile object detector configured to detect a mobile object in the environmental information;
    a feature point map generator configured to generate the detected feature point map on the basis of the environmental information;
    a travel path manager configured to generate a travel path of an environmental information collecting entity on the basis of at least one of mobile object information of the mobile object detector, the initial feature point map stored in the feature point map storage, and the detected feature point map; and
    an environmental information collecting entity controller configured to control the environmental information collecting entity on the basis of the travel path generated by the travel path manager,
    wherein the travel path manager is configured to determine whether the detected mobile object is an occluding object, and modify the travel path, on the basis of a travel direction and speed of the environmental information collecting entity, a distribution and directivity of the occluding object, a distribution of extracted feature points, and a distribution of occlusion.

7. The apparatus of claim 6, further comprising a feature point map updater configured to determine whether to update the initial feature point map on the basis of a variation acquired by comparing the initial feature point map and the detected feature point map and transfer an updated feature point map to the feature point map storage.

8. The apparatus of claim 7, wherein the variation corresponds to changes in number and locations of the pieces of feature point information.

* * * * *